US006298430B1

(12) United States Patent
Roussakov

(10) Patent No.: US 6,298,430 B1
(45) Date of Patent: Oct. 2, 2001

(54) USER CONFIGURABLE ULTRA-SCALAR MULTIPROCESSOR AND METHOD

(75) Inventor: Vladimir P. Roussakov, St. Petersburg (RU)

(73) Assignee: Context, Inc. of Delaware, Tavares, FL (US)

( * ) Notice: Subject to any disclaimer, the term of this patent is extended or adjusted under 35 U.S.C. 154(b) by 0 days.

(21) Appl. No.: 09/532,544

(22) Filed: Mar. 22, 2000

Related U.S. Application Data

(63) Continuation-in-part of application No. 09/088,165, filed on Jun. 1, 1998.

(51) Int. Cl.[7] ................................................. G06F 15/00
(52) U.S. Cl. .............................. 712/15; 712/11; 712/16; 709/200; 709/209
(58) Field of Search ................................. 712/15, 11, 16, 712/37, 23; 709/200, 201, 220, 221, 250, 249

(56) References Cited

U.S. PATENT DOCUMENTS

| 4,891,787 | * | 1/1990 | Gifford | 712/205 |
| 6,107,823 | * | 8/2000 | Agrawal et al. | 326/41 |

* cited by examiner

Primary Examiner—Richard Hjerpe
Assistant Examiner—Mackly Monestino

(57) ABSTRACT

A user-configurable ultra-scalar multiprocessor has a predetermined plurality of distributed configurable signal processors (DCSPs) (1) which are computational clusters that each have at least two sub microprocessors (SMs) (2) and one packet bus controller (PBC) (3) that are a unit group. The DCSPs, the SM and the PBC are connected through local network buses (6). The PBC has communication buses (7) that connect the PBC with each of the SM. The communication buses of the PBC that connect the PBC with each SM have serial chains of one hardwired connection (4) and one programmably switchable connector (5). Each communication bus between the SMs is at least one hardwired connection and two programmably switchable connectors.

11 Claims, 9 Drawing Sheets

USER CONFIGURABLE ULTRA-SCALAR MULTIPROCESSOR AND METHOD

CROSS-REFERENCE TO RELATED APPLICATIONS

This is a continuation-in-part of U.S. patent application Ser. No. 09/088,165, filed on Jun. 1, 1998.

BACKGROUND OF THE INVENTION

This invention relates to user-configurable multiprocessor computational systems having ultra-scalar single-type computational logic.

Developing new computational processor systems for continuously changing application requirements has a primary architectural problem of tradeoff between user selectivity for high specialization efficiency and general-purpose use with lower efficiency. General-purpose processors like the well-known Pentium, PowerPC and Alpha can perform any algorithm that is programmed adequately for using their respectively generalized instruction sets. They can not obtain the performance efficiency, accuracy and speed of application-specific integrated circuits (ASIC) that are developed for specific applications and which implement only the functions that are required to run a dedicated specific task. ASIC structure having computational algorithm generally adequate for a particular application task can be small, less expensive and yet faster than a general-purpose programmable microprocessor. For example, a special graphic module for a PC can accelerate a process of drawing graphical primitives ten-to-twenty times the process speed of a general-purpose processor, but is efficient for one specific computational task only. Any alteration of the task or its conditions makes the ASIC totally useless.

It is not economically feasible to develop ASICs for a vastness of range of applications that is increasing continuously. The conventional solution for achieving ASIC advantages is to construct electronically huge general-purpose microprocessors that have pluralities of separate computational units which can be programmed by a computer manufacturer to function like a specialized ASIC. Each separate conventional computational unit is an oversized, slow and expensive general-purpose microprocessor that is known as a field-programmable gate array (FPGA).

In conventional FPGA architecture, manufacturers construct dedicated smallness efficiency from general-purpose largeness inefficiency. A huge manufacturer-specialized FPGA becomes an ASIC-substitute FPGA that requires massive chip silicon to achieve genuine small ASIC objectives. In addition to orders of magnitude of excess silicon, there is comparable waste of in-and-out computational time with ASIC-substitute FPGAs.

By contrast with this invention, instead of requiring massive excesses of computer-chip silicon and time lag for each of many manufacturer-specialized ASIC-substitute FPGAs, a dynamically reconfigurable microprocessor has been described by the present inventor in a prior patent application having Ser. No. 09/088,165, filed Jun. 1, 1998. In addition to that invention, this invention by the same inventor provides architecture and computational method for further speeding and adapting computer processing.

With dynamic reconfiguration, a user instead of a manufacturer can configure and reconfigure one or a small plurality of microprocessors to accomplish what previously required large pluralities of manufacturer-configured FPGAs or many more ASICs.

Added to dynamic reconfiguration by this invention are higher computational speed, smaller-yet chip size, greater computational adaptivity, greater programmable adaptivity and more "computer-centric" adaptivity.

SUMMARY OF THE INVENTION

Objects of patentable novelty and utility taught by this invention are to provide a user-configurable ultra-scalar multiprocessor and method which:

increases computational speed, accuracy and reliability of user-configurable multiprocessors;

decreases mass, space and cost of computer-chip material required per multiprocessor capability;

decreases quantity of integrated circuits required per multiprocessor capability; and increases ease, speed and convenience of configuring and reconfiguring multiprocessors by users and by computer instruction.

This invention accomplishes these and other objectives with a user-configurable ultra-scalar multiprocessor having a predetermined plurality of distributed configurable signal processors (DCSPs) which each have at least two processing elements which are sub microprocessors (SMs) and one packet bus controller (PBC) that are a unit group. The DCSPs, the SMs and the PBC are connected through local network buses. The PBC has communication buses that connect the PBC with each of the SMs. The communication buses of the PBC that connect the PBC with each SM has serial chains of one hardwired connection and one programmably switchable connector. Each communication bus between the SMs is at least one hardwired connection and two programmably switchable connectors.

Dynamic reconfiguration can be termed user configuration (UC) or integrated-circuit (IC) configuration with architecture that will be referred to herein as a distributed configurable signal processor (DCSP). A DCSP consists of a set of identical processing elements, each of which are a sub microprocessor (SM). Different from an FPGA which is manufacturer programmable, each SM has its own microprogram control. A plurality of SMs can be combined programmably into separate SM groups which operate as specialized processors that can be application specific selectively. This allows the structures of each specialized processor to be adaptable optimally to an application algorithm. A plurality of SMs can be programmably combined into separate groups which operate as virtual and yet different application-specific or variously specialized processors. The architecture of an entire DCSP, therefore, can be configured, adapted and reconfigured to specific application tasks by a user and/or as programmed. This allows a previously impossible level of computer capability, task adaptation, speed and accuracy. When the application task or its conditions are altered, configuration of the DCSP can be altered easily and quickly by user reprogramming of its SM instead of being "field programmable" permanently by a computer manufacturer after being produced by a chip manufacturer of FPGAs.

Highly important in addition, DCSPs are hardware units that employ a new and much faster method for digital signal processing. This new method for digital signal processing is called ultra-scalar (US) processing.

For US processing, coordinated instruction codes for an application task having an input operand are directed to a plurality of SMs for each of the SMs to perform a separate data processing operation on different data digital groups of the input operand. The input operand is split into a plurality of parts that are processed by separate SMs. A designated "master" SM within the plurality of SMs performs a first directed operation on a first data digital group having a first preset plurality of preset high digits of the operand. Sequentially and similarly, one or more SMs designated as "slave" SMs within the plurality of SMs or within neighboring DCSPs 1 then performs a second directed operation on a second data digital group of the operand having a second preset plurality of preset low digits of the operand.

Result digits are obtained in the same order.

As a result digit is obtained from the preset high digits, computations with variable data length can be performed by breaking computations when a required accuracy is reached. Machine instruction is overlapped in time sequences in a manner not possible with conventional parallel computational processing which does not have adequate linkage of computational processing and information between computational processing of high digits and computational processing of low digits. This is an additional increase in computational power of the DCSPs.

In addition, architecture of DCSPs increases operational reliability considerably by proximate overlap implementation of regimes of both ultrareliable and fault-tolerant computations. The ultrareliable computations can be implemented by using a plurality of SMs for a predetermined instruction. Results from the plurality of SMs are compared and, if not the same, then repeated until appropriately similar results are obtained from each of the plurality of SMs. The fault-tolerant computation can be implemented by using functional inter-back up of SMs in a regime of inter-monitoring of SM operability without interruption of the fault-tolerant computation.

Consequently, internal architecture of the virtual-processor DCSPs and their interaction significantly expand computational resources of configuration and thus the performance and reliability of an entire processor.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Figure 1:
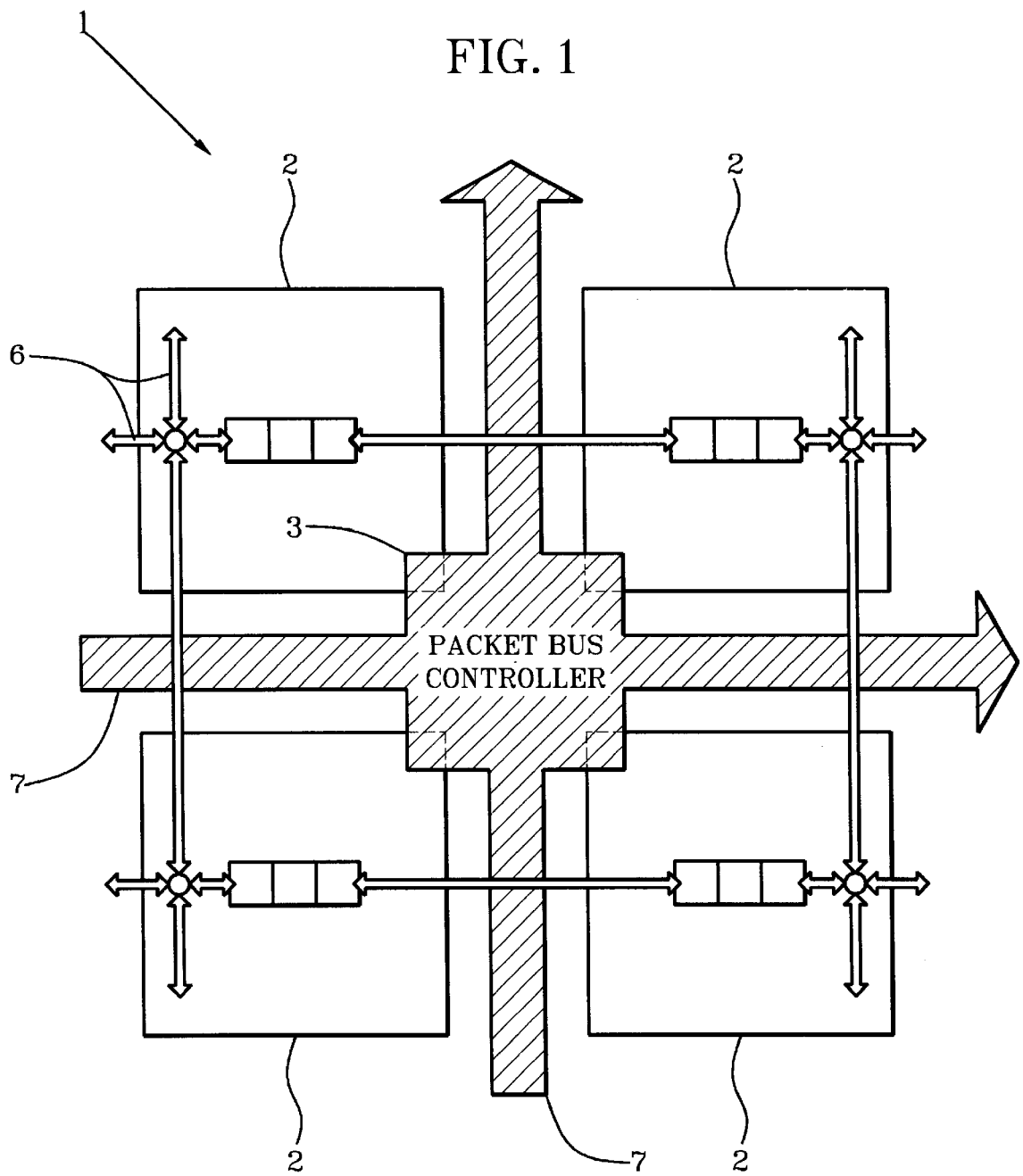
FIG. 1 is a plan view of a computational cluster which is a distributed configurable signal processor (DCSP)

Listed numerically below with reference to the drawings are terms used to describe features of this invention. These terms and numbers assigned to them designate the same features throughout this description.

1. Distributed configurable signal processor DCSP
2. Sum microprocessor (SM)
3. Packet bus controller (PBC)
4. Hard-wire connector
5. Switchable connector
6. Local buses
7. Global buses
8. Shift register file (SRF)
9. Combinatory logical unit (CLU)
10. Microprogram control unit (MCU)
11. Application memory subsystem (AMS)
12. Data and instruction buses
13. Register unit (RU)
14. Multiplexer
15. Configurable memory unit (CMU)
16. Exchange controller
17. Conflict resolver
18. Data and instruction buses
19. Bus A
20. Bus B
21. Bus C
22. Receiving/transmitting/transforming units (RTTU)
23. Micro program control unit (MCU)
24. Packet bus
25. Decoder
26. Local buffer
27. Decoder
28. Addressee sequencer
29. Addressee exchange controller
30. Addressor exchange controller
31. Addressor sequencer
32. Local buffer
33. Transmittal encoder
34. Routing table
35. Local receiving buffer
36. Local transmitting buffer
37. Frame doubler Referring first to FIG. 1, a user-configurable ultra-scalar multiprocessor is an integrated circuit (IC) with at least one computational cluster such as at least one distributed configurable signal processor (DCSP) 1 having at least two processing elements which are sub microprocessors (SMs) and one packet bus controller (PBC) 3 that are a unit group. The sub microprocessors 2 can be main units or auxiliary units of a distributed configurable signal processor 1. Some embodiments of distributed configurable signal processors 1 have one main and one auxiliary sub microprocessor 2. Other embodiments have a different predetermined plurality of main and of auxiliary sub microprocessors 2. The most widely preferable embodiment of the DCSP 1 is a four-unit cluster that is the most optimally computational with four main sub microprocessors 2. The four-unit-cluster distributed configurable signal processor 1 having four sub microprocessors 2 will be described in a manner that explains architecture and functionality for all foreseeable embodiments.

Figure 2:
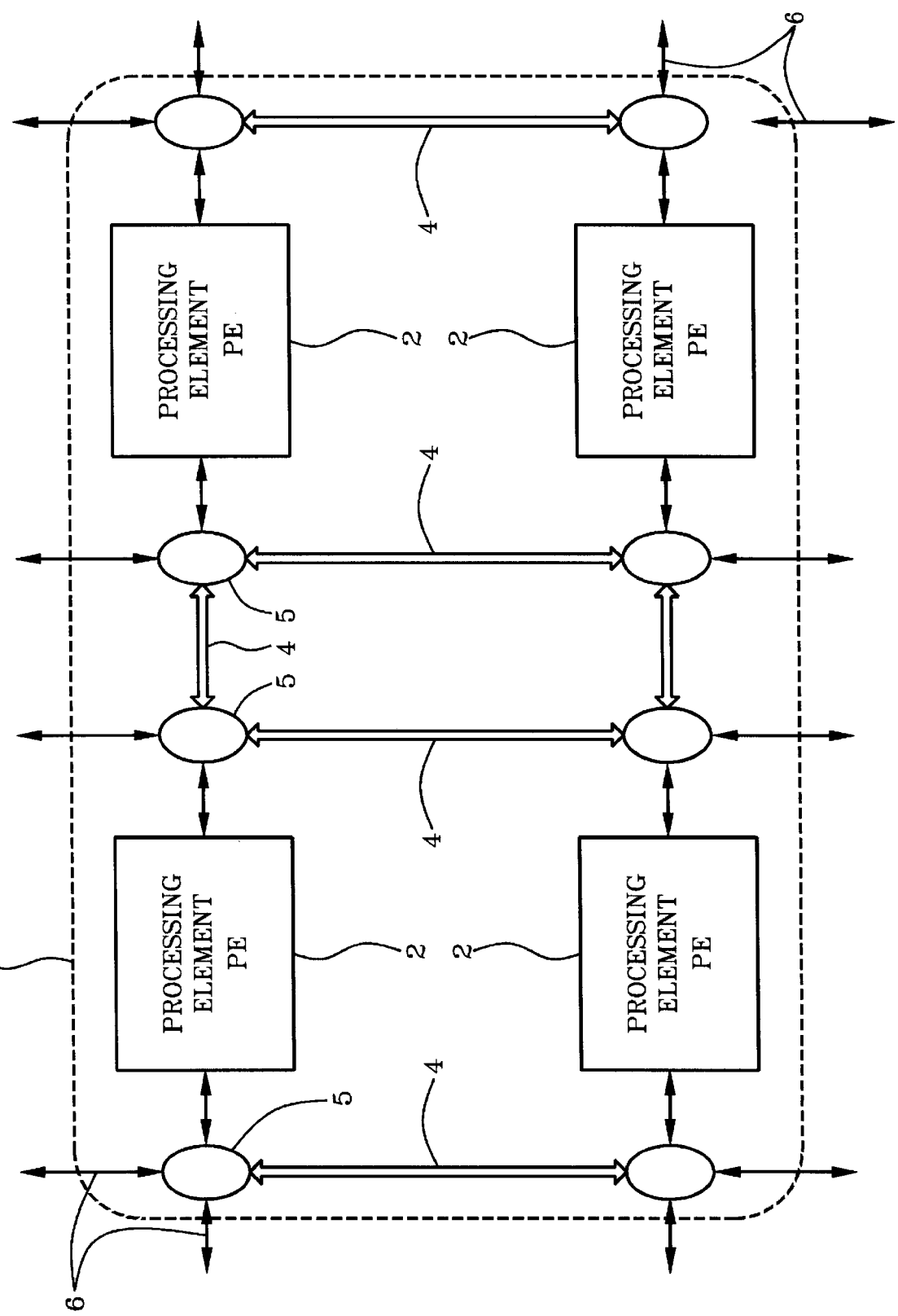
FIG. 2 is a plan view of a processing element which is a sub microprocessor (SM) for the DCSP.

Referring to FIGS. 1–2, the four-unit cluster is a DCSP 1 having a generally square or rectangular matrix with SMs 2 connected through internal local network such as hard-wire connectors 4 and switchable/connectors 5. The switchable connectors 5 are functionally parts of SMs 2, but are depicted separately in FIG. 2 as elements of cluster DCSP 1 internal local network because they function as parts of the DCSP 1 clusters. The DCSP 1 has local buses 6 which interconnect between the SMs 2 and global buses 7 of the PBC 3. This matrix network of a DCSP 1 is a functional microprocessing unit that can be a physical clustering that is separated from other elements of an IC.

As shown in FIG. 2, busses of communication connecting SMs 2 have different routing structures related to positions of the SMs 2 in a matrix of the DCSP 1. In a matrix row, the communication bus connecting two SMs 2 has one hard-wire connector 4 and two switchable connectors 5 connected serially. In a matrix column, the communication bus connecting two SMs 2 has two links, each consisting of one serially connected hard-wire connector 4 and two switchable connectors 5. One link connects SM inputs and the other connects SM outputs. In any diagonal matrix, the communication bus connecting two SMs 2 has two hard-wire connectors 4 and three switchable connectors 5 connected serially.

Connections between local buses of the SMs 2 and the PBC 3 is serial with one hard-wire connector 4 and one switchable connector 5 which is a functional component of the PBC 3 and not shown separately.

Internal local network of clusters is a component of the local network of the entire distributed processor DCSPs 1. This network is an integration of the local networks of all clusters in the user-configurable ultra-scalar multiprocessor. For integrating the cluster's local network into local networks of other clusters, all SMs 2 have additional communication buses. For the four-element cluster, there are two additional communication local buses 6 proximate each side of the SM 2 matrix and four of such local buses 6 at the top and bottom of the SM 2 matrix.

The packet bus controller 3 is a fundamental element of functional separation of the DCSP 1 as a cluster from other computational units of an IC. The PBC 3 provides SM 2 communication through global buses 7 of the user-configurable ultra-scalar multiprocessor's global network.

Figure 3:
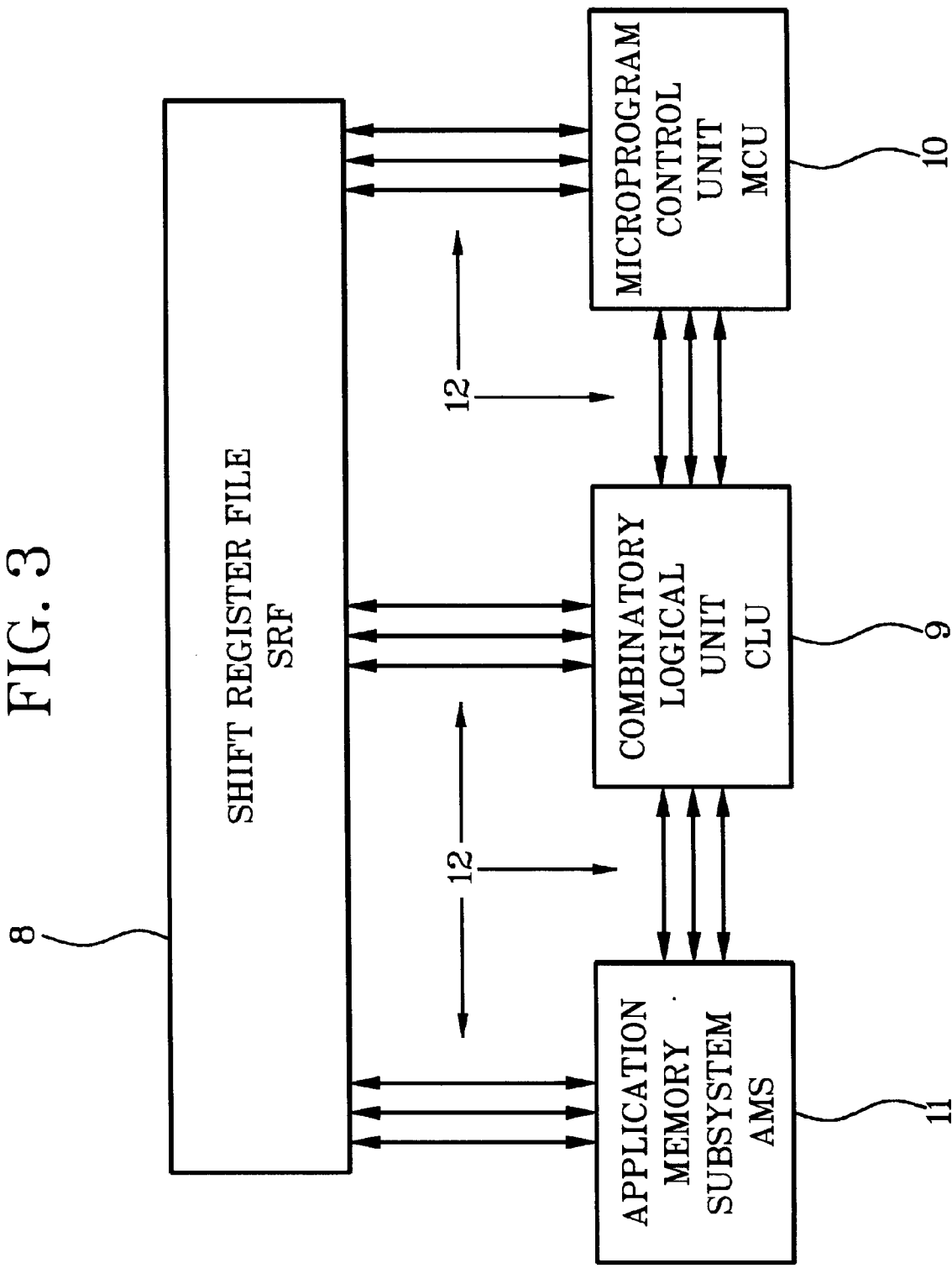
FIG. 3 is a functional diagram of the SM of the distributed DCSP.
Figure 4:
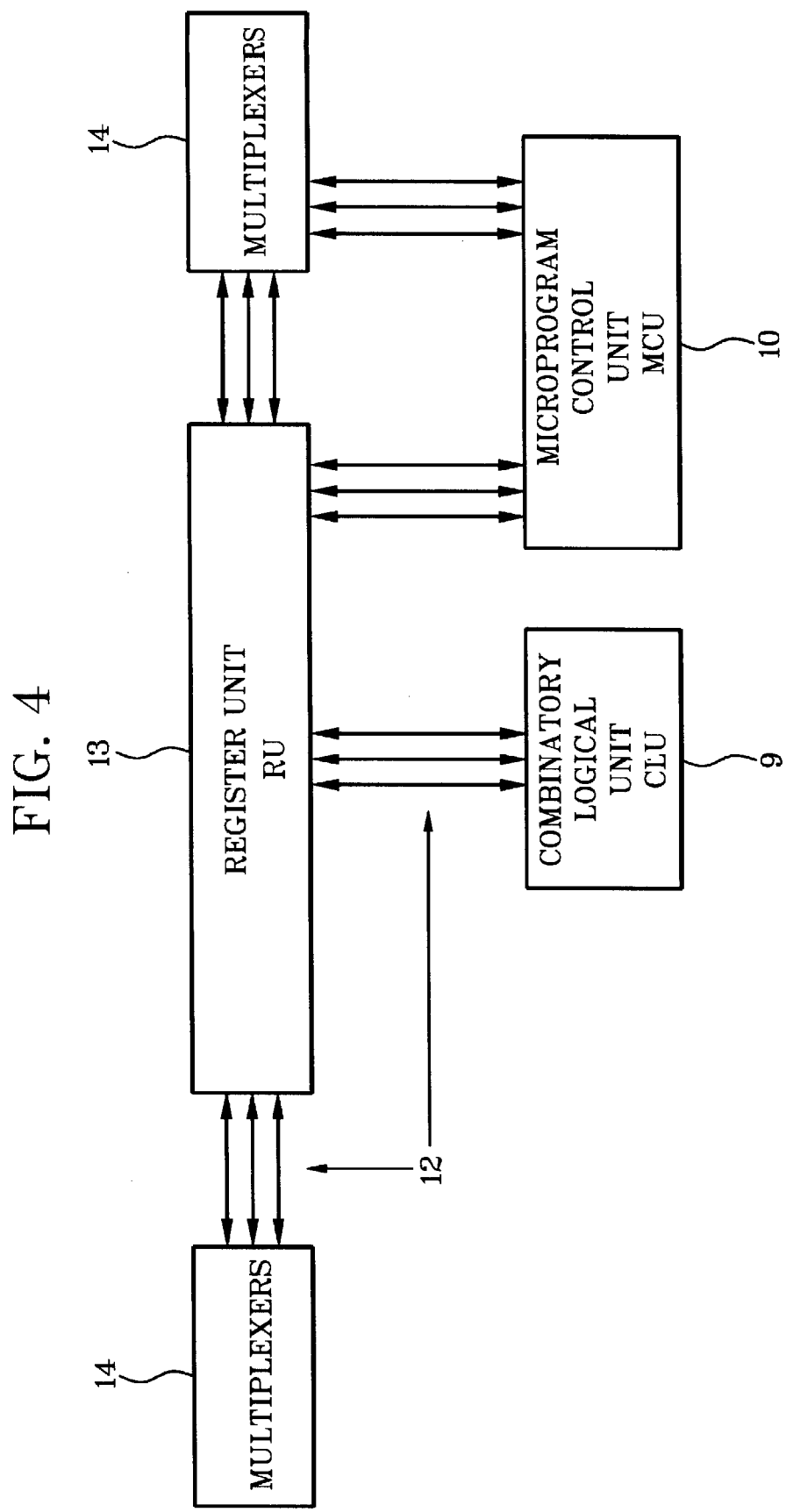
FIG. 4 is a functional diagram of a shift register file (SRF) of the SM.
Figure 5:
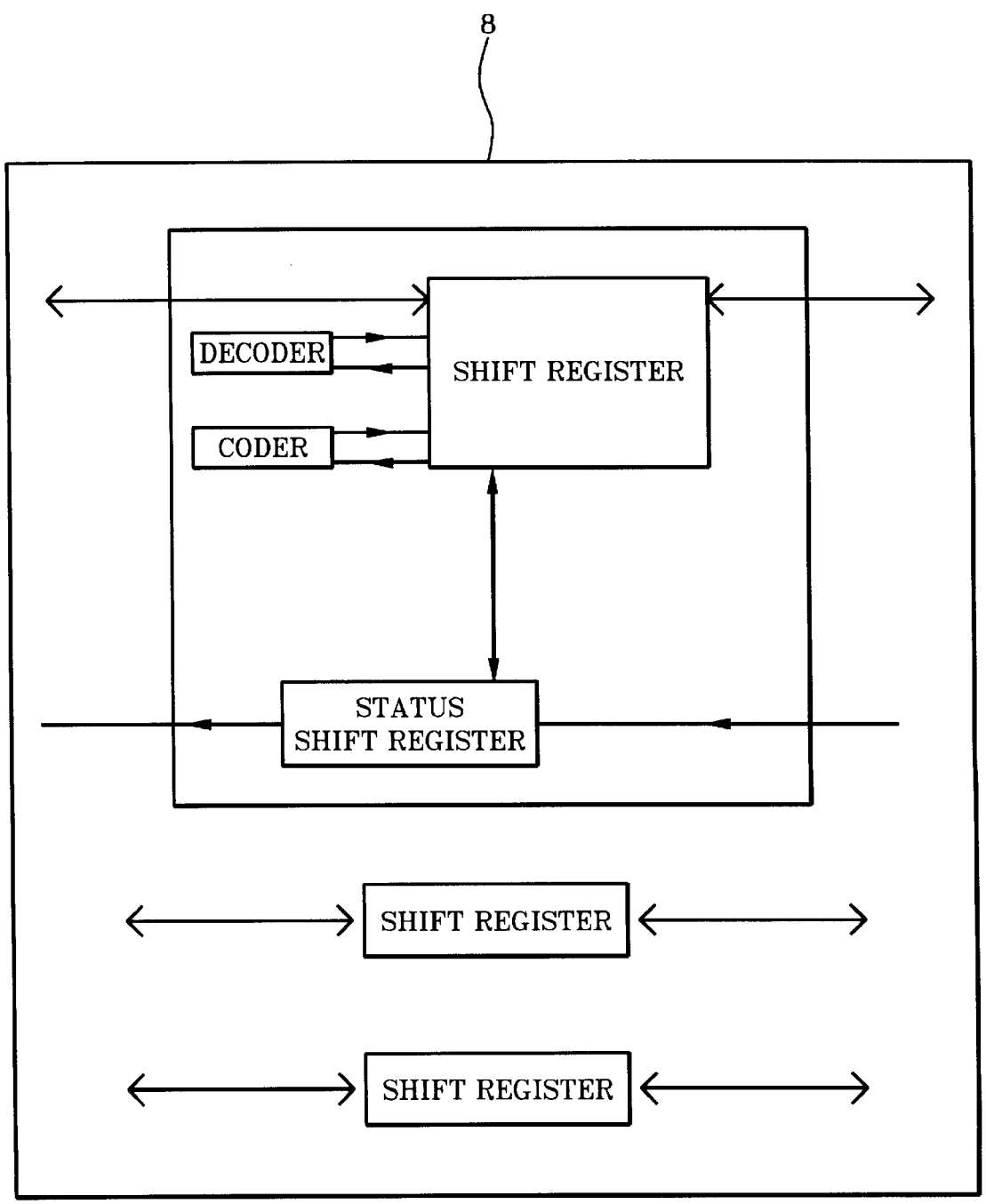
FIG. 5 is a flow diagram of information streams of the SRF.
Figure 6:
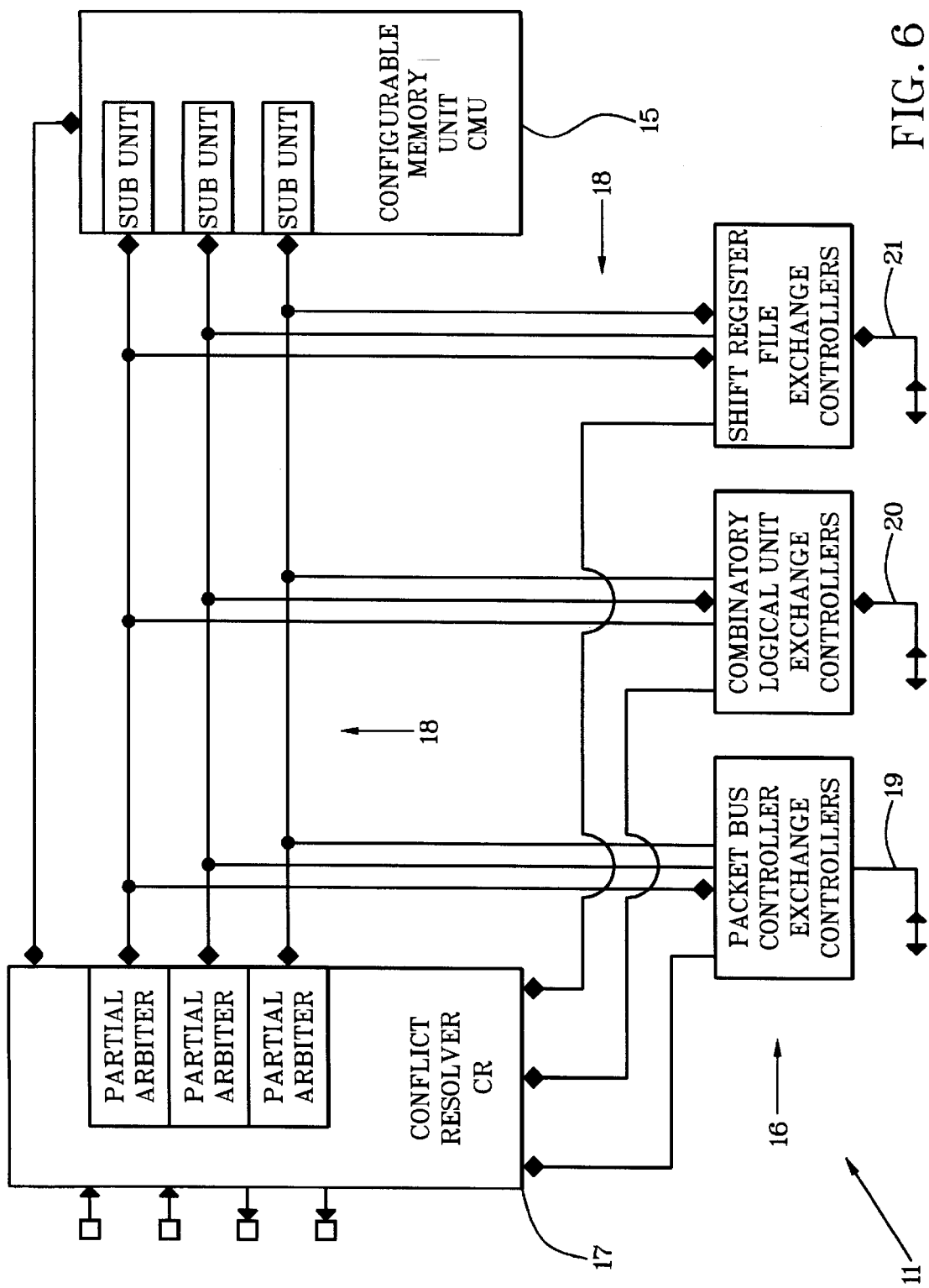
FIG. 6 is a plan view of architecture of an application memory subsystem (AMS)
Figure 7:
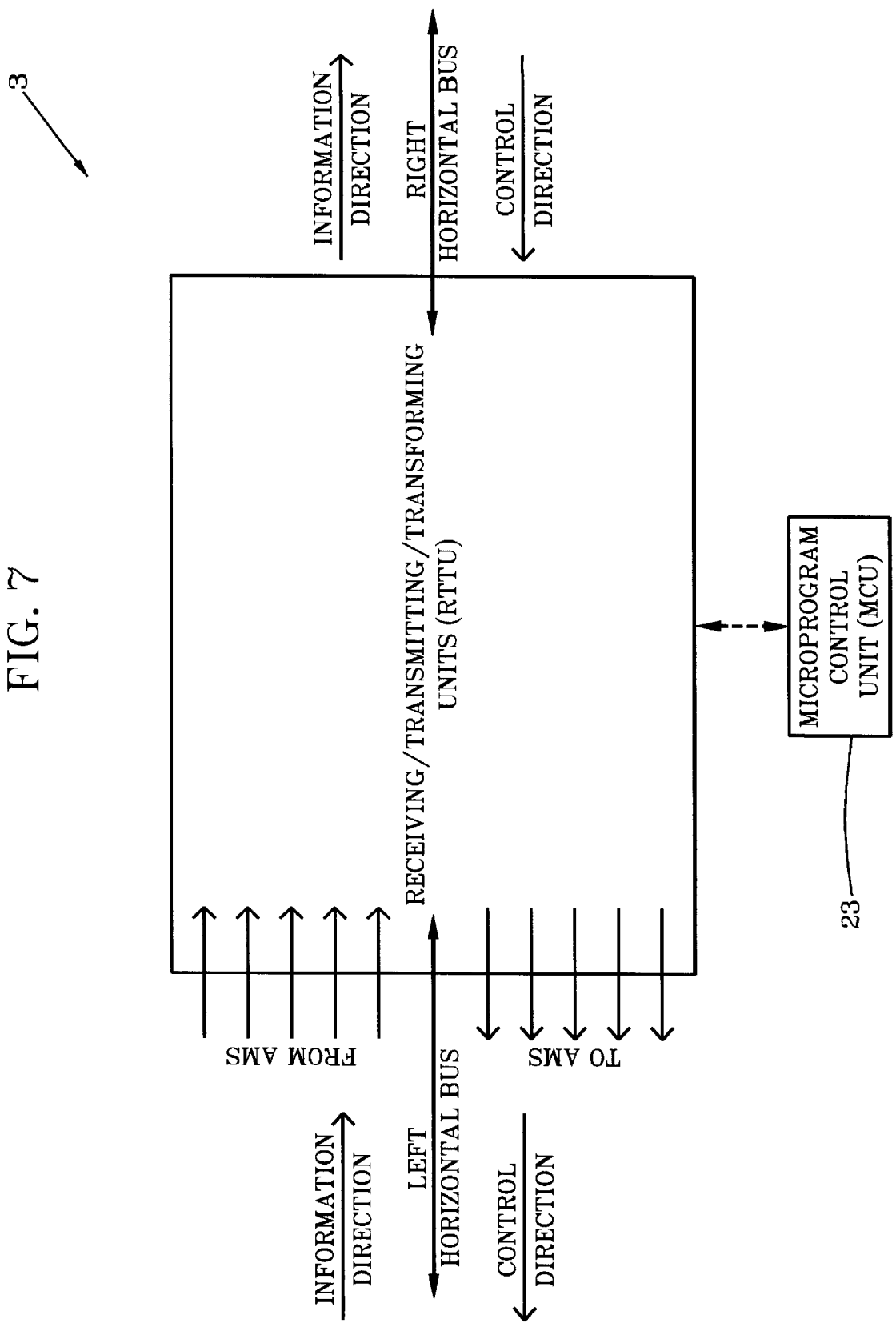
FIG. 7 is a plan view of architecture of a packet bus controller (PBC)

Referring to FIGS. 1–3, each sub microprocessor SM 2, described in relation to FIGS. 1–2, is a quasi-independent or "slave" computer controlled by its own microprogram. As a functional microcomputer, an SM 2 has a shift register file (SRF) 8, a multi-purpose combinatory logical unit (CLU) 9, a microprogram control unit (MCU) 10, and an application memory subsystem (AMS) 11 which are connected through a network of internal data and instruction buses 12. An important feature of the SM as a quasi-independent computer is that its AMS 11 is used not only for its own operation, but also is available for SM of a cluster DCSP 1.

There are three hierarchical levels of operational control of an SM 2. A lowest or core level supports tasks of SM 1 self-testing and other service tasks for operation and maintenance of each separate SM of a predetermined computational cluster DCSP 1. An intermediate level is a user level for running components of users' application tasks. A third and highest control level provides matching time factors of application algorithms.

Referring to FIGS. 1–5, the SRF 8 described in relation to FIG. 3, is a functional element that provides SM 2 with cluster interface through internal local network such as the data and instruction buses 12. The SRF 8 includes a register unit (RU) 13 and two multiplexers 14.

The RU 13 controls traffic of information streams and operating information bidirectionally intermediate the cluster DCSP 1's internal local network and the SM 2.

In order to control direction of information-stream traffic, each multiplexer 14 includes a three-directional switch and is connected to bus groups of the DCSP 1 cluster's internal local network that connects a particular SM 2 with its top and bottom SM 2 matrix of an SM 2 column matrix (FIGS. 1–2) and with a left and/or right neighbor in an SM 2 row matrix (FIGS. 1–2), respectively. Connecting ports of each multiplexer 14 are connected to the RU 13. Operational states of the multiplexers 14 are controlled by instructions from the MCU 10 of a particular SM 2.

Depending on current instruction for SM 2 microprogram control in relation to information packets, RU 13 can either (a) temporarily store an information packet, (b) pass it to an adjacent SM 1 in a local network, (c) pass it to a cluster's PBC 3 through an AMS 11, (d) transmit it to a CLU 9, or (e) transmit the information packet as processed by the CLU 9 to the DCSP 1 cluster's internal local network for its further processing according to a next step of signal processing by the DCSP 1. While exchanging information packets with CLU 9, RU 13 can simultaneously re-code contents of a data fragment in an information packet from a binary coding system into a ternary coding system or vice versa. This re-coding can be done if the CLU 9 in an applicable SM 2 is based on the ternary logic.

Referring to FIGS. 1–6, a main functional unit in the SM 2 is the AMS 11. It includes a configurable memory unit (CMU) 15, three exchange controllers 16 and a conflict resolver (CR) 17. Each exchange controller 16 is connected to the CMU 15 and to the CR 17 through data and instruction buses 18 in an each-to-each scheme. Also, one exchange controller 16 is connected through bus A 19 of the DCSP 1 cluster's local network to the application memory subsystems of other SMs 2 in the DCSP cluster 1. Each of two other exchange controllers 16 is connected through bus B 20 and bus C 21 to combinatory logical unit 9 and shift register file 8 respectively of the SM 2.

The purpose of AMS 11 is to store information and to retrieve it according to requests from corresponding SM 2 units, both from internally within an SM 2 and from other SMs 2.

The AMS 11 is controlled by instructions from corresponding SM 2 units that come through exchange controllers 16. Each exchange controller 16 has an instruction and address decoder. According to received instruction, the exchange controller 16 either writes information into CMU 15 address space or reads it from CMU 15 and transmits it to a channel specified by the instruction. Unlike conventional memory systems with bit structure, for which each address has a memory unit of one byte, AMS 11 has an important function of assuring that information written into CMU 15 occupies only such address space as is set by initial configuration of the CMU 15.

CR 17 resolves conflicts that may occur when service requests come simultaneously from different SMs 2 of the DCSP 1 clusters. A table of service priority is formed in CR 17. According to this table, a special signal for "read and/or write permission" is generated for an exchange controller 16 sending the request for an operation.

Referring to FIGS. 1–8, the PBC 3 is a functional element that connects the DCSP 1 cluster to its interface with global network such as global buses 7 external to the DCSP 1 cluster. Structure of the PBC 3 shown in FIG. 7 includes two information packet framers which are receiving/transmitting/transforming units (RTTU) 22, and microprogram control unit (MCU) 23 for PBC 3. Each RTTU 22, shown in FIG. 8, connects the computational cluster DCSP 1 with horizontal or vertical buses of an SM 2 processor's packet buses. For this reason, RTTUs 22 will be called respectively horizontal and vertical framers in the context of this invention.

Each RTTU 22 framer is connected to a similar PBC 3 with a "pass-through" scheme and a unidirectional information packet stream to MCU 23 with each SM 2 in a DCSP 1 computational cluster and with the RTTU 22 framer from an orthogonal packet bus.

The PBC 3 provides bidirectional exchange of information packets for each SM 2 separately in the DCSP 1 cluster and for the entire DCSP 1 cluster with external global network such as the global buses 7.

Figure 8:
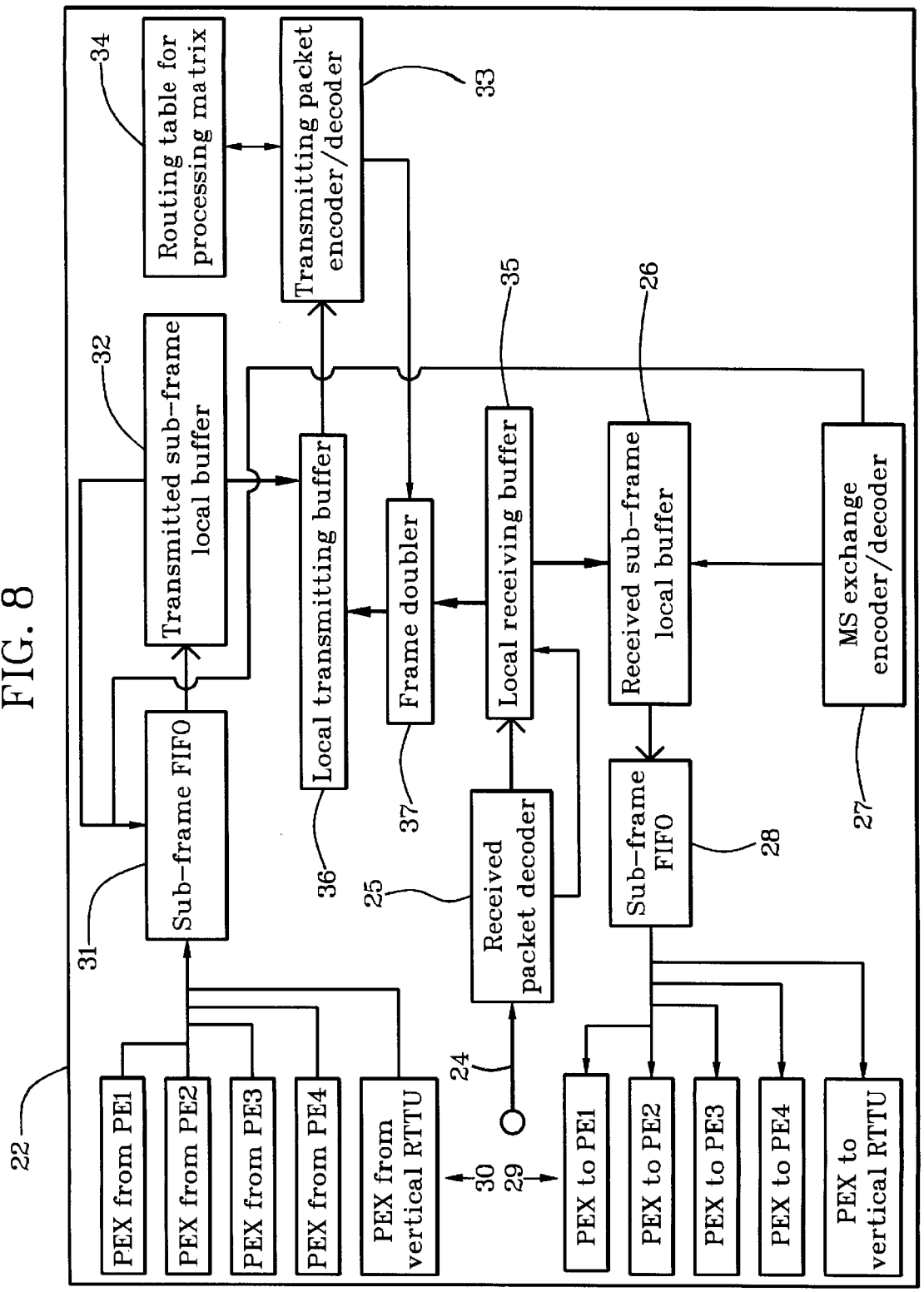
FIG. 8 is an architectural plan view, including links, of a framer of the PBC.

To provide this exchange, each RTTU 22 framer includes units and modules shown in FIG. 8.

Functionally, the RTTU 22 framer shown in FIG. 8 regulates procedures of information-packet exchange between the SM 2 of a DCSP 1 cluster and an either horizontal or vertical bus to which the RTTU 22 framer is connected directly. As information packets addressed to any DCSP 1 cluster can circulate in this bus, and the RTTU 22 framer's DCSP 1 cluster can address its information to any other DCSP 1 cluster, the main task of the RTTU 22 framer is to route information packets that are received and transmitted. An information packet received by the RTTU 22 framer from a corresponding packet bus 24 is decoded by decoder 25.

Figure 9:
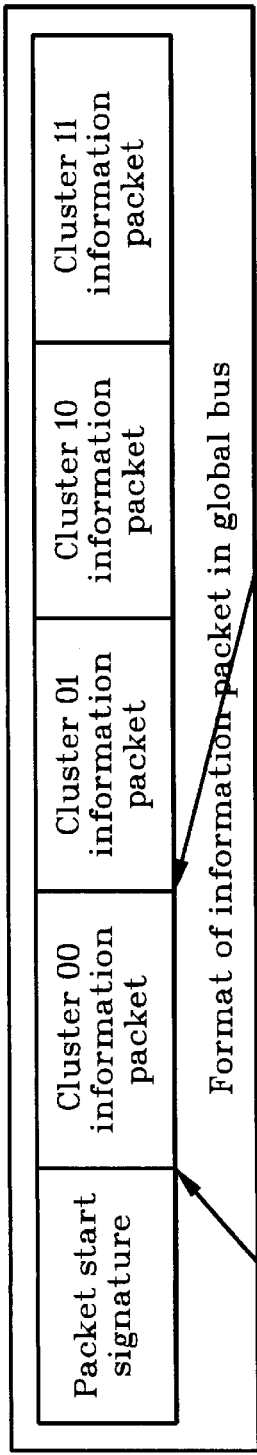
FIGS. 9–11 are a functional plan view of format of an information packet in a global bus, a DCSP's information packet, and an SM's information packet.
Figure 10:
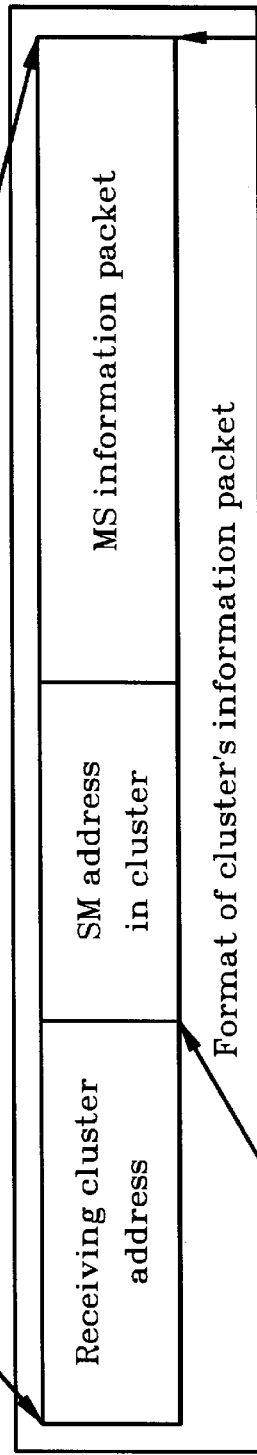
Figure 11:
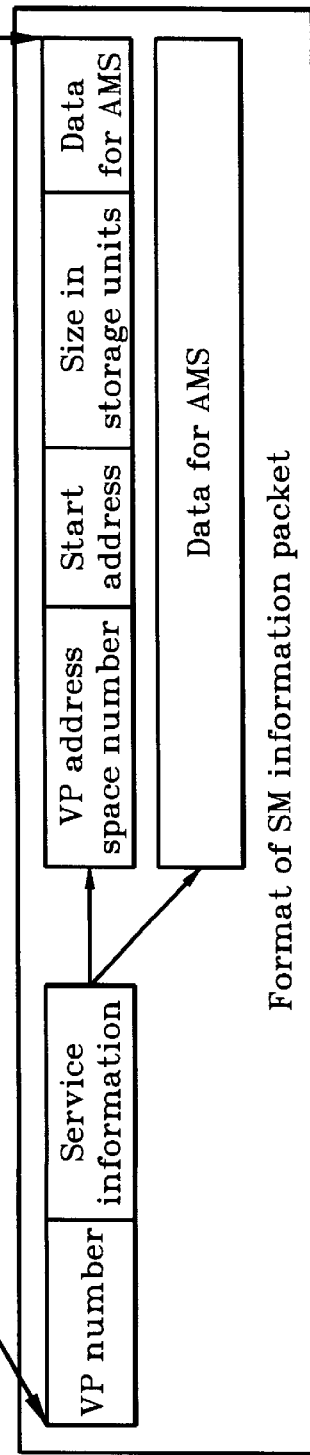

Referring to FIGS. 1–11, FIG. 9 shows the format of the information packet. The decoder extracts the sub-frame addressed to the framer's cluster from the packet. FIG. 10 shows format of this sub-frame. According to instructions from MCU 23 that come through decoder 27, this sub-frame seeks temporal store in local buffer 26 through addressee sequencer 28 and addressee exchange controllers 29 to its addressee, either the corresponding cluster's SM 1 or orthogonal framer. FIG. 11 shows the final format of the information packet. By removing service information on SM 2 and cluster addresses, the addressee sequencer 28 forms final format of FIG. 11 from sub-frame FIG. 10.

Simultaneously, information messages come from the corresponding cluster's SM 2 and orthogonal framer through addressor exchange controllers 30. Their format is shown in FIG. 11. When addressor sequencer, sub-frame FIFO 31, sets sequence order for messages, the messages are transformed into the format shown in FIG. 9 and, after temporal store in local buffer 32, transmittal encoder 33 inserts the messages into the information packet of a standard intercluster exchange format that is shown in FIG. 9. The sequence order for the messages in the packet is set according to routing table 34. Then a ready packet comes to the corresponding bus of the packet bus.

Time match between information packet reception and transmission is made by temporal store of received transmitted packets in local receiving buffer 35 and in local transmitting buffer 36. If there is no transmitted packet, it is replaced by its duplicate from frame doubler 37.

Description of operation of computational cluster:

According to the invention, the computational cluster in the architecture of the distributed configurable processor, DCSP 1, is a physically existing structural module that, depending on the control microprogram executed by its first and second SM 2 units, can be either a virtual functionally oriented processor or part of such virtual processor. For example, the control microprograms can be such that a computational cluster operates as a vector processor performing simultaneously processing of components of multicomponent vector. At that, the maximum dimension of a processed vector can be equal to the number of SMs 2 in a chip. In this case, each SM 2 processes one component of the vector. If the dimension of the processed vector is less than the number of SMs 2 in the chip, the rest of the SMs 2 are free and can be used for composite scalar operation where the regime of ultra-scalar (US) computations is implemented. The sub microprocessors (SM) in the cluster then operate as a virtual ultra-scalar processor.

A cluster is initialized when power comes to the IC. At this moment, the resident microprogram INIT (initialization) starts in each SM 2 and PBC 3. The microprogram has a procedure for self-test in each SM 2, and sets it into a SLAVE state. INIT microprogram procedure in the PBC 3 fills the routing table with the information on operability of each SM 2 that is used later for further control of traffic and routing for SM 2 intake and output information streams.

When all SM 2 and the PBC 3 finish the resident initialization microprogram, the cluster is ready for the first operation stage, which is forming the entire virtual processor or a processor consisting of several other clusters of the configurable processor. If the processor uses resident application software, which is determined by the task solved by the processor and its conditions, the SRF 8's controllable multiplexers 14 are set by instructions from microprogram control units of the SM 2 to the switching states that form information stream routing according to the first computational (operational) step of the executed program. This switching of switchable connectors 5 (FIG. 2) forms a configuration of local network that transmits data between several SM 2 of the cluster, or to and from an SM 2 of a neighbor cluster, or with PBC 3. Thereby, such a configuration of information exchange is formed between a cluster's node and its closest neighbor(s) (using buses 6) that is/are optimized for the first step of the executed application program. Taking into account the microprograms of computational data processing loaded in each SM 2, this configuration is the implementation of a virtual application-specific processor. If only core software is resident in the distributed configurable processor, DCSP 1, the virtual processor is formed similarly, except that the core software loads from external memory service information from the application task. Basing on this information, the software performs all necessary presets for the virtual processor used in this task. Thereby, the configuration of the virtual processor is optimized to the forthcoming computational procedure. Then, the codes necessary for the application task are loaded into this virtual processor after being already configured. After loading, the execution starts, and the application runs in the configured virtual processor. During operation, the virtual processor can be reconfigured at the next step, both by its computational clusters and programmably assigned functions.

All of a cluster's SM can work either in an asynchronous mode or in a synchronous mode, when clocking is made by clock frequency from one SM 2 in the cluster. In this case, the clocking SM 2 is called a "master SM".

Description of control of cluster operation in the ultra-scalar computation regime:

A control method for using this invention is referred to an ultra-scalar (US) processing. Basically, this control method is a process of forming a virtual ultra-scalar computer with the physical structure of the distributed configurable signal processor 1. At least two SM 2 in one or several DCSP 1 computational clusters are configured initially in a structure group with preparation for reception of packet data in a form of an n-digit operand through the cluster's internal local network. Such configured structure is a hardware component of the virtual ultra-scalar processor.

The control microprograms for the sub microprocessors 2 from this structure group assign the same processing operation for all sub microprocessors from this structure group. Each sub microprocessor performs this operation only with a part of an operand consisting of (s+m) operand digits, and with digit-by-digit processing, starting from the operand's predetermined higher digits. Length of the group of (s+m) operand digits processed in each sub microprocessor 2 is determined by two components: (1) the operand's split part s=n/k, where n is the operand length and K is the number of sub microprocessors 2 forming the virtual ultra-scalar processor, and (2) an integer constant m called "the delay of non-autonomous algorithm" in the computation algorithm theory. The term m has a value within the range 4 ... 7. For example, for a computational cluster consisting of four units and configured as the ultra-scalar processor, the length of the operand digit group processed by each sub microprocessor 2 should be (64/4+4)=20 when processing 64-digit operands.

The control microprograms of the sub microprocessors 2 from the configured structure of the virtual ultra-scalar processor also regulate all sub microprocessors 2 to start operand processing not simultaneously, but with a certain time lag. The sub microprocessor 2 programmably assigned for processing operand's higher digits starts the processing first. The processing start is synchronized with the operand's first higher digit that comes from the cluster's internal local network.

Operands are processed serially digit-by-digit, starting from higher digits. When the first sub microprocessor 2 finishes processing the first s higher digits of an operand, it continues processing the following m lower digits of the operand. Simultaneously, another sub microprocessor 2, programmably assigned to be second for processing s operand's digits following its first s higher digits, starts processing is "own" s digits of the operand, part of which coincides with said m lower digits of the first sub microprocessor. As the first one, this sub microprocessor 2 processes the operand serially digit-by-digit starting from the highest digits. Then, if necessary, the third and fourth sub microprocessors 2 start processing the operand in the same way.

The result of operand processing is also entered into the cluster's local network serially digit-by-digit in the "first-in-first-out" (FIFO) order. Therefore, the results of operand processing appear starting from the higher order.

In an embodiment of the invented method for control of the operation of the computational cluster, DCSP 1, the sub microprocessors 2 are programmed additionally to stop operand processing when a z-th (targeted) higher digit is processed.

An advantage of the invented method for control of the operation of the computational cluster in the regime of ultra-scalar computation in comparison to other known computational methods is the ability to increase the computational power of the digital signal processor due to higher utilization of chip material and hardware resources. This is so because when long operands are processed, only one or two sub microprocessors of (s+m) precision are used, rather than the entire processor of corresponding high precision. At the same time, all other sub microprocessors 2 of the distributed processor (DCSP 2) which have finished their operand digits can be used for other processing tasks. The specific embodiment of the invented method for the control of the computational cluster has especially high potential in this increased utilization of hardware resources.

A new and useful user-configurable ultra-scalar multiprocessor having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A user-configurable ultra-scalar multiprocessor comprising:

a predetermined plurality of distributed configurable signal processors (DCSPs) which each have a predetermined plurality of sub microprocessors (SM) and one packet bus controller (PBC) that are a unit group;

the distributed configurable signal processors, the sub microprocessors and the packet bus controller being connected through local network buses;

the packet bus controller having communication buses that connect the packet bus controller with each of the sub microprocessors;

the communication buses of the packet bus controller that connect the packet bus controller with each sub microprocessor having serial chains of one hardwired connection and one programmably switchable connector; and communication buses between the sub microprocessors have at least one hardwired connection and two programmably switchable connectors.

2. The user-configurable ultra-scalar multiprocessor of claim 1, wherein:

the predetermined plurality of sub microprocessors of the unit group is four sub microprocessors;

the four sub microprocessors are connected in a square matrix;

the communication buses of two adjacent sub microprocessors in a matrix row of sub microprocessors has a serial chain of one hardwired connection and two programmably switchable connectors;

the communication buses of two adjacent sub microprocessors in a matrix column of sub microprocessors has two parallel chains of one hardwired connection and two programmably switchable connectors;

the two programmably switchable connectors are separate for input and output of the two adjacent sub microprocessors; and the communication bus for two diagonally adjacent sub microprocessors is a chain of two hardwired connections and three programmably switchable connectors.

3. The user-configurable ultra-scalar multiprocessor of claim 1, wherein:

the local network buses have at least one additional communication bus connecting the local network buses with the sub-microprocessor's internal local network proximate a portion of the sub-microprocessor's internal local network that connects the sub microprocessors of the distributed configurable signal processors.

4. The user-configurable ultra-scalar multiprocessor of claim 3, wherein:

the local network has two communication buses at oppositely disposed sides, four communication buses at a top and four communication busses at a bottom of the matrix of the sub microprocessors.

5. The user-configurable ultra-scalar multiprocessor of claim 2, wherein:

the local network has two communication buses at oppositely disposed sides, four communication buses at a top and four communication busses at a bottom of the matrix of the sub microprocessors.

6. The user-configurable ultra-scalar multiprocessor of claim 1, wherein:

the sub microprocessor includes a shift register file subsystem, a multi-purpose combinatory logical unit, a microprogram control unit, and an application memory subsystem, which are connected through a set of internal instruction and data communication buses.

7. The user-configurable ultra-scalar multiprocessor of claim 6, wherein:

the shift register file subsystem includes a register file and two controller multiplexers;

the multiplexers are connected separately to a corresponding group of communication buses in the local network and are connected separately to the register file through a corresponding group of internal-data and instruction-communication buses; and the register file is connected to the combinatory logical unit through other groups of internal-data and instruction-communication buses.

8. The user-configurable ultra-scalar multiprocessor of claim 6, wherein:

the application memory subsystem includes a configurable memory unit, three exchange controllers and a conflict resolver, the exchange controllers are connected to the configurable memory unit and to the conflict resolver through corresponding groups of internal-date and instruction-communication buses by an each-to-each scheme;

a first one of the exchange controllers is connected to application memory subsystems of other sub microprocessors in a cluster through corresponding buses of the local network; and a second and third ones of the exchange controllers are connected to the combinatory logical unit and to the shift register file subsystem through a corresponding group of internal-date and instruction-communication buses.

9. The user-configurable ultra-scalar multiprocessor of claim 1, wherein:

the packet bus includes two information-packet receiving/transmitting/transforming units which are packet framers for vertical and horizontal buses of the distributed configurable signal processors and for a microprogram control unit;

the two receiving/transmitting/transforming units are connected to a global bus of a corresponding distributed configurable signal processor; and the receiving/transmitting/transforming units of predetermined distributed configurable signal processors are interconnected through corresponding internal-data and instruction-communication buses.

10. A method comprising the following steps for control of a user-configurable ultra-scalar multiprocessor:

microprogramming sub microprocessors of distributed configurable signal processors of the user-configurable ultra-scalar multiprocessor by interconnecting internal multiplexers of the sub microprocessors for a select group of the sub microprocessors to be configured to receive one n-digit digital operand through internal local network of the user-configurable ultra-scalar multiprocessor which is a computational cluster;

each of a plurality of sub microprocessors executing an assigned processing instruction with a group of (s,+m) digits of the operand;

one control instruction being a single execution for the plurality of sub microprocessors;

inputting operand digits into a bus of local network of the user-configurable ultra-scalar multiprocessor digit-by-digit in a first-in-first-out order;

with a beginning one of the sub microprocessors, starting processing of the operand sequentially from predetermined high digits of the operand when the operand's first high digit arrives from the bus of the local network;

with at least one sequential sub microprocessors, continuing processing of the operand following a delay by (k–k )s machine clocks in relation to arrival of an operand's first higher digit, where K is the number of sub microprocessors in the user-configurable ultra-scalar multiprocessor that are activated by a processing instruction for the operand, k is a number of sub microprocessors in the user-configurable ultra-scalar multiprocessor that received a processing instruction but have not started processing;

the number of digits in operands processed in each sub microprocessor is set according to a condition $\Sigma s=n$ and m is an integer digit within the range 4 . . . 7.

11. The method of claim 10, wherein:

the sub microprocessors are programmed to stop processing of the operand when a predetermined high digit of the operand is processed.

* * * * *